C. J. HEINEMAN & A. H. HENSLEY.
DYNAMO ELECTRIC MACHINE.
APPLICATION FILED SEPT. 4, 1909.
1,095,632.
Patented May 5, 1914.
4 SHEETS—SHEET 1.
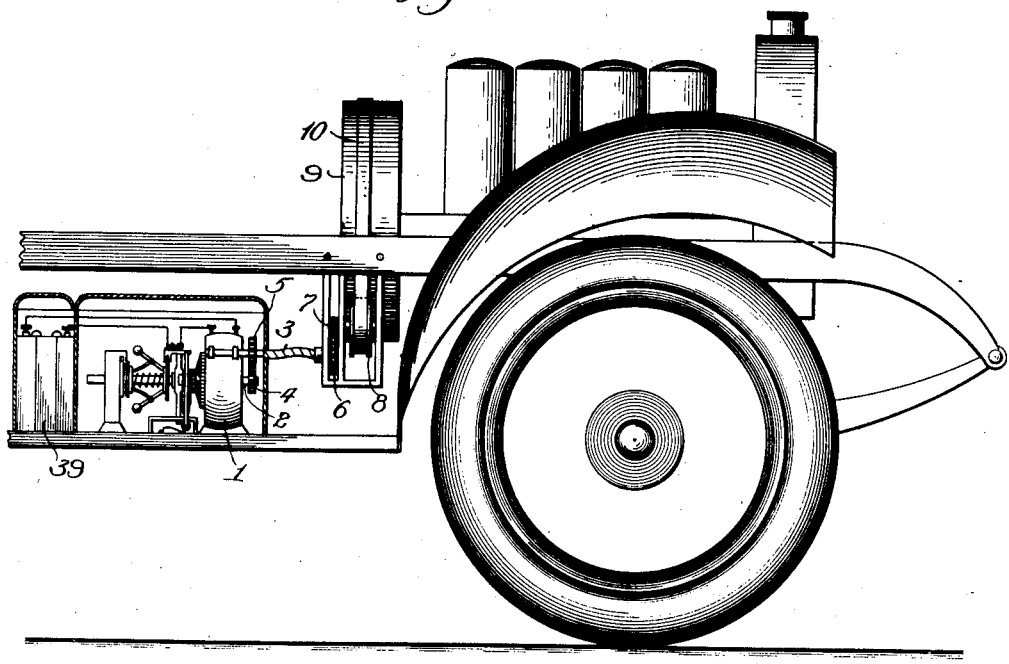
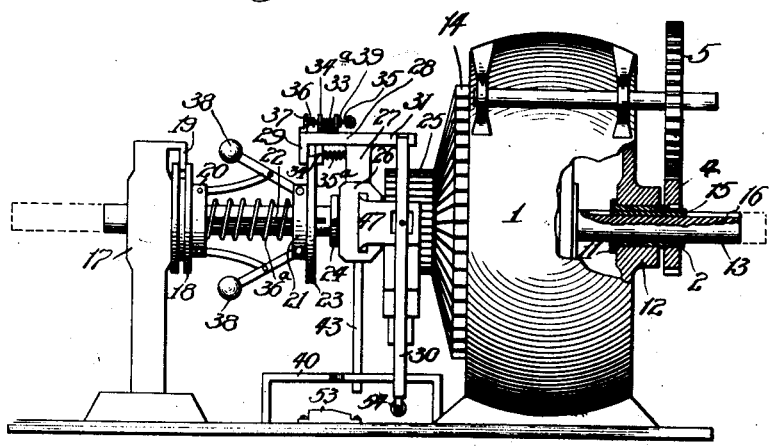

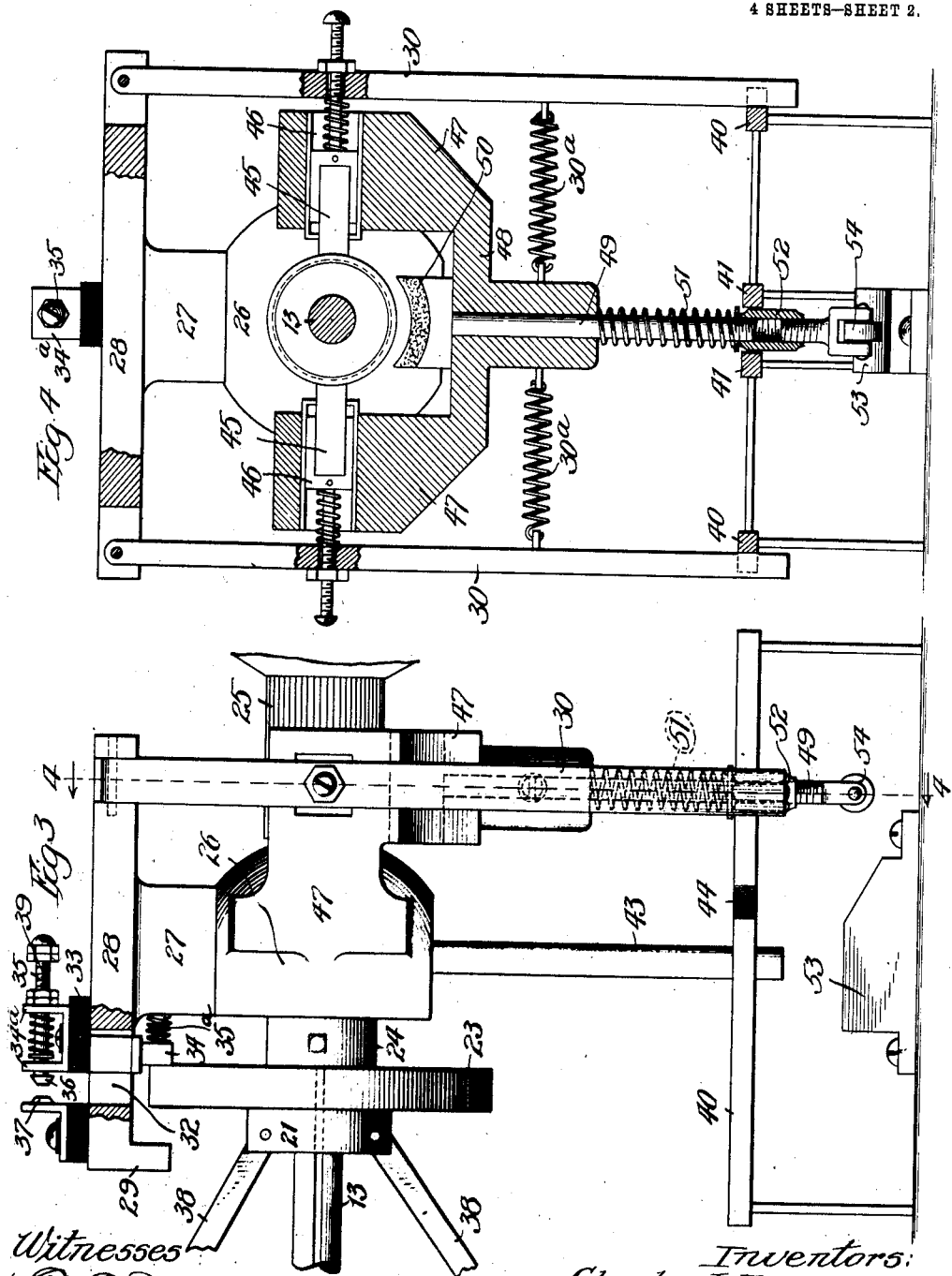

C. J. HEINEMAN & A. H. HENSLEY.
DYNAMO-ELECTRIC MACHINE.
APPLICATION FILED SEPT. 4, 1909.
1,095,632.
Patented May 5, 1914.
4 SHEETS—SHEET 3.
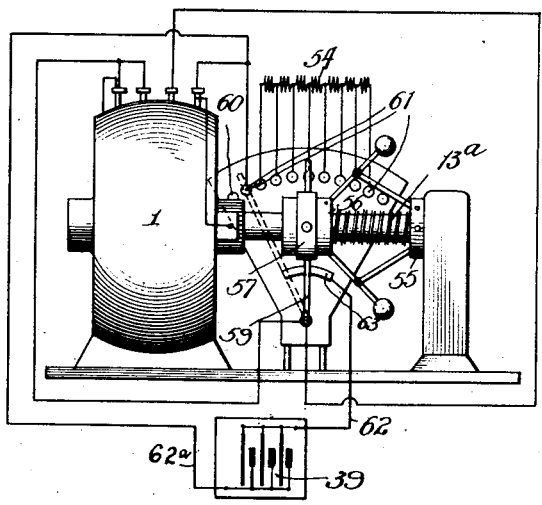
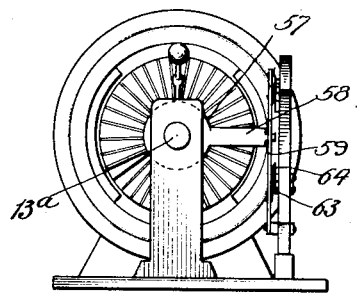
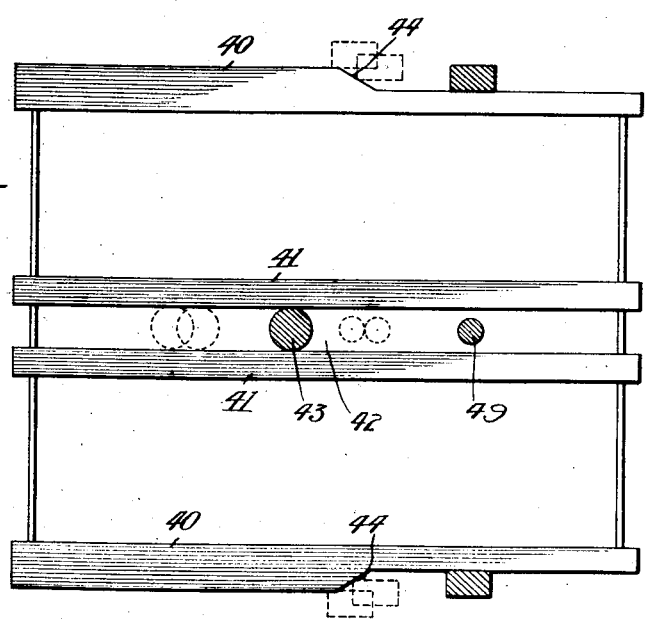
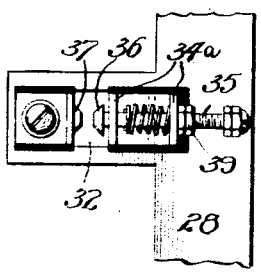
Witnesses:
Inventors
Charles J. Heineman
Archibald H. Hensley
By Barton & Folk
Attys

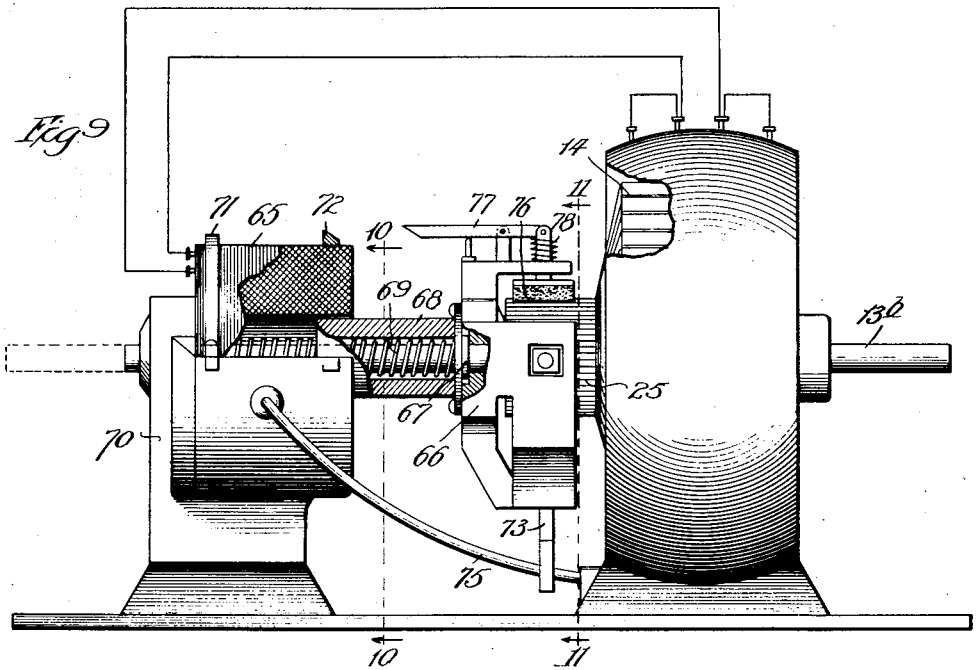

UNITED STATES PATENT OFFICE.

CHARLES J. HEINEMAN AND ARCHIBALD H. HENSLEY, OF CHICAGO, ILLINOIS; SAID HEINEMAN ASSIGNOR TO SAID HENSLEY.

DYNAMO-ELECTRIC MACHINE.

1,095,632.     Specification of Letters Patent.     Patented May 5, 1914.

Application filed September 4, 1909. Serial No. 516,211.

*To all whom it may concern:*

Be it known that we, CHARLES J. HEINEMAN and ARCHIBALD H. HENSLEY, citizens of the United States, residing at Chicago, in the county of Cook and State of Illinois, have invented a certain new and useful Improvement in Dynamo-Electric Machines, of which the following is a full, clear, concise, and exact description.

Our invention relates to dynamo electric machines and more particularly to means for regulating the voltage and current output of generators, and is especially designed to supply current of approximately uniform voltage from a generator driven at variable speeds.

The object of our invention is to provide simple and efficient voltage regulating means that will automatically control the voltage so as to make the same suitable for the purpose for which the electric output is to be used, as, for example, for charging storage batteries or for other like purposes.

Our invention contemplates controlling the magnetic flux in such manner as to cause the same so to vary with the speed at which the generator is driven as to produce an approximately uniform voltage and current output from a generator which is driven at variable speeds.

In the preferred embodiment of the invention, the speed of the armature shaft controls the operation of a governor which in turn controls the effective magnetic flux from the pole pieces, as for example, preferably by automatically drawing the armature, mechanically or electrically, endwise from between the pole pieces.

Our invention, while not limited to any particular use, is especially applicable to generators used for charging storage batteries and driven from the axle of a car, as for example, from the axle of an automobile. As embodied in a machine for performing this special function, our invention also comprises several detail features hereinafter described and claimed.

Our invention may be more readily understood by reference to the accompanying drawings in which, Figure 1 is a side elevation showing our invention employed in connection with an automobile; Fig. 2 is an enlarged, detail side elevation, partly in section, of the generator and the voltage regulating mechanism; Fig. 3 is an enlarged, detail view in side elevation of the brush carriage and its guide; Fig. 4 is a sectional view on the line 4—4, Fig. 3; Fig. 5 is a top plan view of the carriage guide; Fig. 6 is a fragmentary top plan view of the upper portion of the frame of the brush carriage; Fig. 7 is a diagram, in front elevation, of a modified form of the invention; Fig. 8 is an end elevation of the structure shown in Fig. 7; Fig. 9 is a side elevation of a still further modification of our invention; Fig. 10 is a sectional view on the line 10—10 of Fig. 9; and Fig. 11 is a sectional view on the line 11—11 of Fig. 9.

Similar letters of reference designate like parts throughout the several views.

Referring first to the preferred embodiment of our invention shown in Figs. 1 to 6 inclusive, the generator 1 is mounted upon the running board or other suitable portion of the automobile, and the hollow shaft 2 of the generator is driven from the flexible shaft 3 through the medium of the gear wheels 4 and 5. The flexible shaft 3 is itself driven from the axle of the car by means of any suitable system of gearing, as for example, the end of the shaft 3 carries a gear 6 which meshes with a gear 7 mounted upon the same shaft with a pulley 8, the latter being driven from a fly wheel 9 through the medium of a belt 10. The shaft 2, upon which the gear 4 is mounted, is a short hollow shaft provided with a bearing or collar 11, said shaft rotating in bearings 12 in the shell of the generator. The main shaft 13, upon which is mounted the armature, passes through the hollow shaft 2 and is caused to rotate therewith by key 15, said key 15 fitting in an elongated keyway 16 in the shaft 13, in order to permit of the endwise reciprocation of said shaft. In addition to its bearing in the hollow shaft 2, the shaft 13 is provided with a bearing in the standard 17. The end of the shaft adjacent the standard 17 is provided with a collar 18 which is held against the standard 17 by means of a flange 19 projecting therefrom, the shaft 13 being thus adapted to move endwise through the collar 18 and bearing 17. Secured to the collar 18 is a fixed sleeve 20 of a centrifugal governor, the sliding sleeve 21 of which has a limited longitudinal movement relative to the shaft 13 determined by the length of a sliding keyway 22 provided in the shaft 13. The sliding sleeve 21 has secured thereto a disk 23, the movement of which is, therefore, controlled by the centrifugal governor.

Mounted upon the shaft 13 between a fixed collar 24 and the commutator 25 is a hub 26 from the upper portion of which extends a support 27 for the carriage 28. Said carriage top is provided at one end with a downwardly extending flange or lug 29 in position to be engaged by the disk 23. The other end of the carriage top 28 is provided with forks or prongs 31 and brush carrying arms 30 are pivotally suspended from said forks.

The carriage top is provided with an elongated slot 32 (see Fig. 6) forming a guideway for a movable switch carriage 33, the bed of which is of insulating material. Mounted upon the switch carriage 33 are standards 34ª forming suitable supports for the spring-press plunger 35, the forward end of which is provided with a suitable contact point 36 which engages with the fixed contact point 37 mounted upon the carriage top 28. The plunger-rod 35 is adjusted to open and close at the proper time by means of lock nuts 39. Extending downwardly from the under side of the switch carriage 33 is a lip or flange 34 which projects in the path of longitudinal movement of the disk 23, the upper edge of said disk being interposed between the flanges 29 and 34. The flange 34 is normally thrust outward by means of the coiled spring 35ª, as shown in Fig. 2, to close the contacts 36, 37.

When the generator is at rest, and consequently the arms 38 of the governor are not subjected to centrifugal force, the coiled spring 36ª pushes the sliding sleeve 21 away from the fixed sleeve 20, and in so doing thrusts the armature 14 into the usual position within the inclosing shell of the generator, the end of the shaft 13 then projecting to the position indicated in the dotted lines at the end of Fig. 2. In his case, as shown in Fig. 3, the disk 23 abuts against the collar 24, said disk 23 also engaging the lug 34 and pushing back the carriage 33 and thereby separating the contact points 36 and 37, the coiled spring 35ª being at the same time put under tension. When the car starts up, the consequent rotation of the armature shaft 13 causes the arms 38 of the centrifugal governor to fly outward and thus to withdraw the disk 23 from its position at rest against the collar 24. Such withdrawal of the disk 23 permits of the spring 35ª forcing forward the carriage 33 so as to close the circuit controlled by the contact points 36 and 37. It is obvious that the plunger 35 can be so adjusted as to regulate the time of closure of said contact points. As shown in Fig. 1, the generator 1 may be used for charging the storage batteries 39, and hence the contact points 36 and 37 which control the circuit from the generator to the storage batteries are in such case so adjusted as not to close until a voltage suitable for charging said batteries is reached.

As the speed of rotation of the main shaft increases, thus causing the sliding sleeve 21 to approach still closer to the fixed sleeve 20, the disk 23 engages with the flange 29 thus carrying along the carriage 28 and its supporting hub 26. The hub 26 engages the fixed collar 24 of the shaft 13, and in its longitudinal movement carries with it the shaft 13. The armature 14 is thus drawn endwise from between the pole pieces, the extent of such endwise movement being controlled by the rotary speed of the shaft 13. The armature, as its speed of rotation increases, is withdrawn from between the pole pieces a sufficient distance to so reduce the number of lines of magnetic flux cut by armature conductors that an approximately uniform voltage will be produced by the generator regardless of the speed at which the armature is rotating.

Mounted near the base of the generator is a carriage guide consisting of side plates 40 and two intermediate strips 41, the latter being separated to provide a guideway 42 (see Fig. 5) for a rod 43 which projects downwardly from the hub 26. The rod 43, fitting in the guideway 42, overcomes any tendency of the hub 26 to rotate by reason of the friction of the main shaft 13 within said hub. Each of the side plates 40 is provided at some suitable point with a cam face 44.

The lower ends of the brush carrying arms 30 are held by springs 30ª against the outer edges of said plates 40, and thus maintain said brushes in proper relation to the commutator 25. As shown most clearly in Figs. 3 and 4, the brushes 45 are adjustably mounted in the pivoted arms 30 and project through guideways 46 formed in arms 47 which project from the opposite sides of the hub 26. When the armature 14 has been withdrawn as far as is practical, it is, of course, desirable to break the circuit which charges the storage batteries, or otherwise an increase in speed of the shaft might raise the voltage higher than is desirable. Hence, the cam faces 44 are located at such points on the guide plates 40 as to swing the arms 30 outwardly and thus to withdraw the brushes 45 from engagement with the commutator, when the speed of the generator increases beyond the limits at which it is desirable to utilize the output thereof.

The arms 47 are connected at the under side of their outer ends by a yoke 48 through which projects a vertical rod 49. Said rod is provided at its upper end with a brush 50 suitable for cleaning the commutator 25. The brush 50 is normally held out of engagement with the commutator by the tension of the coil-spring 51 which surrounds the rod 49 between the yoke 48 and a sleeve 52 adjustably mounted on said rod 49. Mounted upon the base of the carriage guide is a cam block 53. The lower end of the rod 49 is provided with a roller 54 which is adapted, when the armature has been withdrawn a predetermined distance, to ride upon the inclined surface of the block 53 and thus to press the brush 50 into contact with the surface of the commutator 25 to clean the same. The block 53 may be located at any desired position, but is preferably so located as to cause the cleansing of the armature at the time the brushes 45 are withdrawn from contact with the commutator.

Figs. 7 and 8 show a modified form of our invention for regulating the output of current from a dynamo 1 driven at variable speeds. The centrifugal governor in this modified form is arranged to operate a rheostat and thus to control a resistance in series with the exciting field of the dynamo.

Referring more particularly to Figs. 7 and 8, the armature shaft $13^a$ has secured thereto the fixed sleeve 55 of the centrifugal governor, the sliding sleeve 56 of which carries a collar 57. The collar 57 is provided with a radially projecting arm 58 which engages with the pivoted rheostat arm 59 and hence oscillates the same back and forth to cut in or cut out a portion of the resistance 54, dependent upon the speed of the shaft and the consequent operation of the centrifugal governor. When the shaft $13^a$ is at rest, the rheostat arm 59 will rest upon the idle button 60. The distance traversed by the arm 59 from the idle button 60 to the first one of the series of buttons 61 controlling the resistance 54 corresponds to the speed at which the shaft 13 must rotate in order that the dynamo may produce a voltage sufficiently high to charge the storage batteries 39. Further acceleration of the speed of the shaft $13^a$ will cause the governor to move the arm 59 over the series of buttons 61 and cut resistance into the field circuit, thus regulating the voltage of the charging circuit so as to make the same approximately constant whatever may be the speed of the armature shaft. The charging circuit may be also controlled by the rheostat arm in such manner that the circuit is closed only when the voltage is approximately that suitable for charging the batteries. As shown diagrammatically in Fig. 7, conductor 62 from one side of the storage batteries is electrically connected to a segmental strip 63 and the other side of the storage battery is connected by a conductor $62^a$ with the rheostat arm 59. Said rheostat arm is provided with a spring contact member or brush 64 adapted to engage with the metallic segment 63 and thus to act as a switch for controlling the closing of the battery charging circuit.

The modified form of our invention shown in Figs. 7 and 8 thus also provides mechanically operated means whereby the speed of the shaft acts upon a centrifugal governor and thereby regulates the voltage of the current supplied by the dynamo.

Figs. 9, 10 and 11 show a modified form of our device in which the armature 14 is drawn, through the action of the solenoid 65, endwise from between the pole pieces as the speed of the shaft $13^b$ becomes excessive. The brush carriage 66 is mounted upon the shaft $13^b$ between the fixed collar 67 and the commutator 25. Projecting from the carriage 66 and surrounding the shaft $13^b$ is a hollow plunger 68 forming the core of the solenoid 65. When the armature is at rest or is rotating at low speed the tension of the helical spring 69 is sufficient to maintain said armature in its normal position between the pole pieces of the generator. The windings of the solenoid 65 are connected in any suitable manner in circuit of the generator and the degree of energization of said windings is therefore dependent upon the current output of the dynamo. When the speed of rotation of the armature becomes so great as to raise the voltage of the generator above that required of it, the increased energization of the coil 65 causes the plunger 68 to be drawn in, thus also moving the shaft $13^b$ and the armature 14 endwise and reducing the voltage of the dynamo in the manner hereinbefore described with respect to the modification shown in Figs. 1 to 6, inclusive.

The solenoid 65 is mounted in any suitable manner upon a standard 70 which forms a bearing for one end of the shaft $13^b$. As shown in the drawings, such solenoid may be held in place by straps or bands 71, 72.

Projecting downward from the under side of the carriage 66 is an arm 73, bifurcated at its lower end to form a slot 74 which receives a guide-rod 75. The guide-rod 75 holds the brush carriage in a suitable position for maintaining the brushes 45 at proper relation to the commutator 25. The guide-rod 75 is preferably cam-shaped and extends in a somewhat helical manner from the base of the dynamo toward the bearing 70 to which one end of said rod is attached. The cam-shape of the guide-rod 75 causes the brushes 45 to be shifted about the commutator as the speed of the armature increases thereby reducing the tendency of the formation of an arc at the brushes when the machine is driven above normal speed.

The carriage 66 may also have mounted thereon a commutator-cleaning brush 76 which operates, in a manner similar to the brush 50 hereinbefore described, to clean the surface of the commutator. The brush 64 is preferably pivoted to a lever 77 pivotally mounted upon the brush carriage 66, and is normally held by the spring 78 out of contact with the commutator. The free end of the lever 77 is beveled and is adapted to engage the oppositely beveled strap 72 when the armature has been withdrawn from between the pole pieces. When the free end of the lever 77 rides over the beveled surface of the strap 72, the opposite end of said lever is depressed and the brush 76 is thrust into engagement with the surface of the commutator 25.

From the foregoing description it will be noted that our invention provides efficient and accurate means for controlling the voltage of a generator which is driven at variable speeds, and adapts the output of the generator to be employed in such commercial applications as require an approximately uniform voltage in the supply of electric current.

While our invention is peculiarly adapted to be employed in connection with automobiles or other vehicles or cars, to charge storage batteries for lighting or other purposes, it will be readily understood that our invention is not limited to any particular use.

Though we have described the preferred embodiment of our invention and other alternative structures, we do not wish to be understood as limiting ourselves to the specific structures shown, since our invention is capable of being embodied in still other arrangements and combinations within the scope of the appended claims.

What we claim is:

1. In a variable speed electric generator, the combination with stationary pole pieces, of a rotary armature mounted to reciprocate longitudinally and thereby adapted to be withdrawn longitudinally from between said pole pieces, means automatically controlled by the speed of rotation of said armature for adjusting the longitudinal position of said armature, a commutator and its brushes mounted to reciprocate with said armature, and cam mechanism acting on said brushes in the withdrawn position of said armature to control the position of said brushes with respect to said commutator.

2. In a variable speed generator, the combination with stationary pole pieces, of an armature mounted to reciprocate longitudinally and thereby adapted to be withdrawn endwise from between said pole pieces, a carriage mounted to reciprocate with said armature, a commutator, collector brushes carried by said carriage, for collecting current from said commutator, and a cam operating when the armature is in its withdrawn position to control the position of said brushes with respect to said commutator.

3. In a dynamo electric machine, the combination with a generator having a shaft and an armature carried thereby arranged to be driven at variable speeds, said armature being mounted to reciprocate lengthwise and thereby adapted to be withdrawn endwise from between the pole pieces of the machine, of a centrifugal governor mounted upon the armature shaft, means operated by said governor for controlling the longitudinal movement of the armature, a circuit for the electric output of said machine, and means likewise controlled by said governor for controlling the continuity of said circuit.

4. In a dynamo electric machine, the combination with a generator having a shaft and an armature carried thereby arranged to be driven at variable speeds, said shaft being mounted to reciprocate lengthwise and thereby to draw said armature endwise from between the pole pieces of the machine, of a centrifugal governor mounted upon the armature shaft, said governor having a fixed sleeve through which said shaft reciprocates and a sliding sleeve having a limited sliding movement with respect to said shaft, a carriage mounted upon said shaft and arranged in its movement to reciprocate said shaft, a switch mounted upon said carriage, and means operated by the sliding movement of said sliding sleeve to control said switch, said means also operating at predetermined positions in the movement of said sleeve to reciprocate said shaft.

5. In a dynamo electric machine, the combination with a generator having a shaft and an armature carried thereby arranged to be driven at variable speeds, said armature being mounted to reciprocate lengthwise and thereby adapted to be withdrawn endwise from between the pole pieces of the machine, of a centrifugal governor mounted upon the armature shaft, said governor having a fixed sleeve and a sliding sleeve having a limited sliding movement with respect to said shaft, a carriage, a support for said carriage mounted to reciprocate with said armature, a switch mounted upon said carriage, and means operated by the sliding movement of said sliding sleeve to control the closure of said switch, said means also operating at predetermined positions in the movement of said sleeve to withdraw said armature endwise from between the pole pieces of the machine.

6. In a dynamo-electric machine, the combination of a stator, a rotor, governing means adapted to shift said rotor relatively of said stator in an axial direction, a circuit-breaker controlled by said governing means, said governing means being adapted to automatically actuate said circuit-breaker to close the circuit when said rotor is driven at a certain predetermined speed and to shift said rotor axially with respect to said stator when said predetermined speed is exceeded.

7. In a dynamo-electric machine, the combination of a stator, a rotor, governing means adapted to shift said rotor relatively to said stator in an axial direction, a circuit-breaker controlled by said governing means, said governing means being adapted to automatically actuate said circuit-breaker to close the circuit when said rotor is driven at a certain predetermined speed and to shift said rotor axially with respect to said stator when said predetermined speed is exceeded, and means acting between said rotor and stator for resisting said relative axial movement and coacting with said governing means to maintain a substantially constant voltage between certain minimum and maximum speeds of the rotor.

In witness whereof, we hereunto subscribe our names this first day of September, A. D. 1909.

CHAS. J. HEINEMAN.
A. H. HENSLEY.

Witnesses:
GEORGE E. FOLK,
GEO. C. DAVISON.